United States Patent [19]

Hollmann

[11] 4,453,449

[45] Jun. 12, 1984

[54] HOLDING APPARATUS

[75] Inventor: Martin Hollmann, Cupertino, Calif.

[73] Assignee: Westinghouse Electric Corp., Pittsburgh, Pa.

[21] Appl. No.: 300,843

[22] Filed: Sep. 10, 1981

[51] Int. Cl.³ .......................... F16L 27/00; F41F 3/06
[52] U.S. Cl. .................... 89/1.806; 89/1.812;
 285/316; 403/322; 403/328
[58] Field of Search .......... 89/1.812, 1.56, 1.806;
 403/322, 328, 321, DIG. 8; 285/316, 315

[56] References Cited

U.S. PATENT DOCUMENTS

| | | | |
|---|---|---|---|
| 3,252,721 | 5/1966 | Weasler | 285/316 X |
| 3,267,963 | 8/1966 | Hupp | 285/316 X |
| 3,302,960 | 2/1967 | Herrmann | 285/316 X |
| 3,444,773 | 5/1969 | Ligne | 89/1.806 X |
| 3,693,484 | 9/1972 | Sanderson | 403/328 X |
| 4,198,080 | 4/1980 | Carpenter | 285/316 X |
| 4,289,414 | 9/1981 | Recker | 403/328 X |

Primary Examiner—David H. Brown
Attorney, Agent, or Firm—F. J. Baehr, Jr.

[57] ABSTRACT

A holddown apparatus having a sleeve with a plurality of fingers, the reactive length of which is varied in order to provide any predetermined engaging and release force to detents which engage a groove in a shaft that is attached to a missile to form a passive holddown apparatus which is reusable.

9 Claims, 5 Drawing Figures

HOLDING APPARATUS

BACKGROUND OF THE INVENTION

This invention relates to a holddown and released apparatus and more particularly to such an apparatus for a missile launcher.

Holddown and release apparatus in the past require pyrotechnic or electric devices to initiate release. The apparatus described hereinafter is a mechanical passive apparatus releasing when a predetermined force is applied.

SUMMARY OF THE INVENTION

In general, a holddown apparatus, when made in accordance with this invention, comprises a shaft having a nose portion on one end thereof and a circumferential groove adjacent the one end, the groove has a generally semicircular cross section and a mass is attached to the second end of the shaft; a receptacle having a bore for receiving the shaft and a plurality of ports in communication with the bore; a plurality of detent members slidably disposed in the ports; a sleeve slidably disposed over a portion of the receptacle. The sleeve has a plurality of notches forming digital members which contact the detent members.

The holddown apparatus also comprises a skirt disposed over the sleeve, the skirt has protrusions extending from the inner side thereof which contacts the digital members and a portion which extends beyond the receptacle. The length of the shaft and the position of the ports are so disposed that the nose contacts the detents before the extended porton of the skirt contacts the mass and the extended portion of the skirt contacts the mass before the detent members contact the groove in the shaft, whereby the protrusions extending from the inner side of the skirt slide toward the distal end of the digital members of the sleeve to increase the force subsequently applied through the shaft to initiate removal of the groove from the detent members when the shaft is subsequently extracted from the receptacle.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
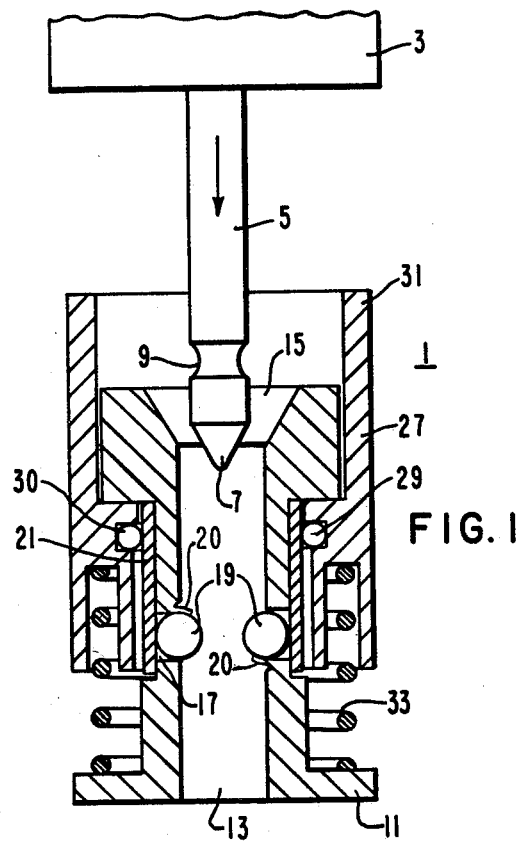
FIG. 1 through 4 are sectional views of holddown apparatus made in accordance with this invention in various phases of their operation.

Referring now to the drawings in detail and in particular to FIG. 1, there is shown a holddown apparatus 1 for a missile 3 or other mass.

The holddown apparatus 1 comprises a shaft 5 having a conically-shaped nose portion 7 with a rounded or blunted point on one end thereof. Disposed adjacent the nose portion 7 is a notch or circumferential groove 9 having a semicircular cross-section. The shaft 5 is fastened to a surface on the lower end of the missile 3.

The holddown apparatus 1 also comprises a receptacle 11 having a bore 13 centrally disposed therein for receiving the shaft 5. One end of the bore 13 is counterbored to form a funnel-shape opening 15 for guiding the nose portion 7 of the shaft 5 into the bore 13. A plurality of ports 17 or holes are disposed in a circular array in the lower end of the receptacle 11. Detents 19 are slidably disposed in the port 17 and retained therein by lips 20 on the inner ends of the ports 17. In the embodiment shown, the detents 19 are spherical. However, they could be any shape which would provide inclined ramps which mate with the groove 9 in the shaft 5 to convert axial shaft forces to axial forces in the detents.

Figure 5:
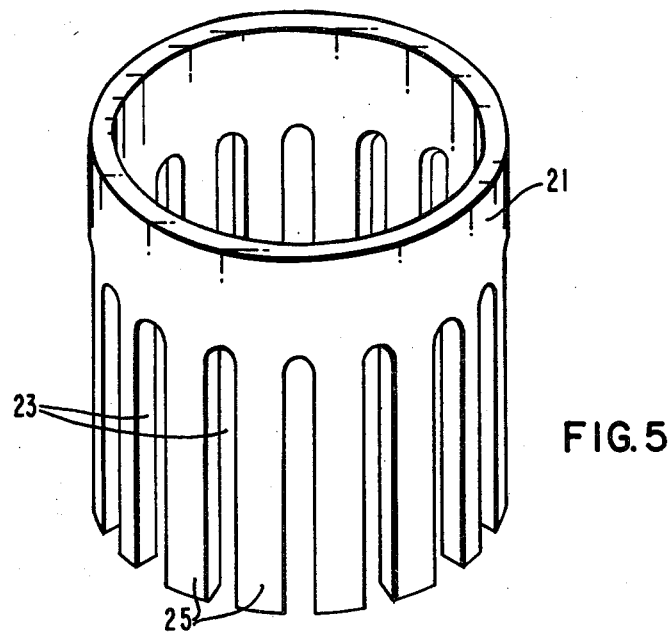
FIG. 5 is a perspective view of a sleeve utilized in the holddown apparatus.

A sleeve 21 is disposed over a portion of the outer surface of the receptacle 11 and, as shown in FIG. 5, has a plurality of notches 23 extending from one end thereof to form a plurality of digital members or fingers 25 which contact the detents 19.

Slidably disposed over the sleeve 21 is a skirt 27 having protrusions 29 disposed on the inner portion thereof which contact the digital member 25 of the sleeve 21. In the preferred embodiment, the protrusions 29 are spherical members or balls disposed in openings 30, however, the protrusions can be any shape including being formed by a counterbore. The protrusions 29 contact the digital members 25 and as the skirt 27 slides over the sleeve 21, the protrusions 29 move closer or further from the detent 19 changing the stiffness of the digital members 25 resulting in respectively a greater or lesser force being applied through the shaft in order to move the detent members to free them from the groove or allow them to move back to accept the nose portion of the shaft. The skirt 27 also has an upwardly extending member 31 which extends beyond the receptacle 11 and a spring 33 or other means for biasing the skirt toward the missile.

The operation of the holddown apparatus can be more clearly understood by referring to the drawings 1 through 4.

Figure 2:
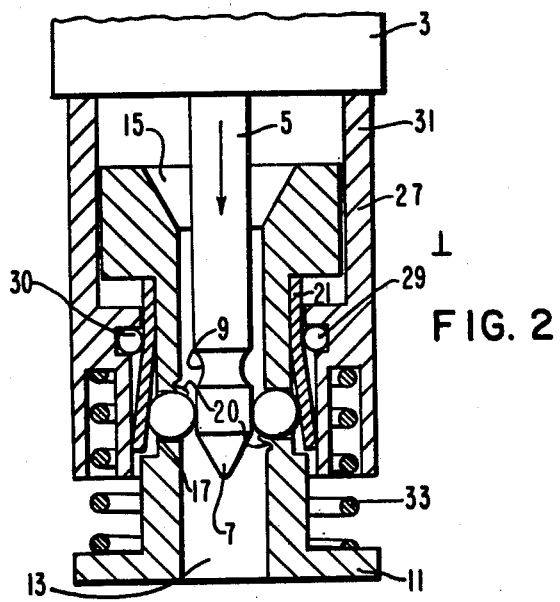
Figure 3:
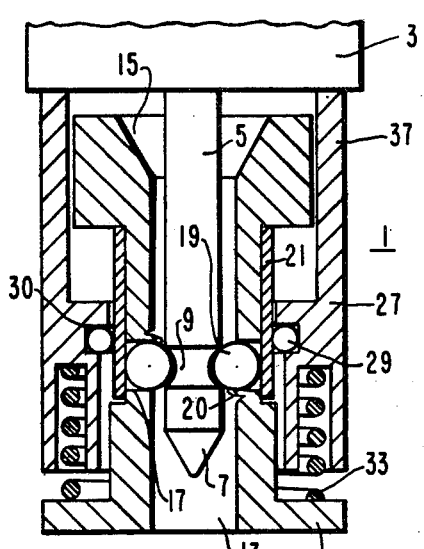
Figure 4:
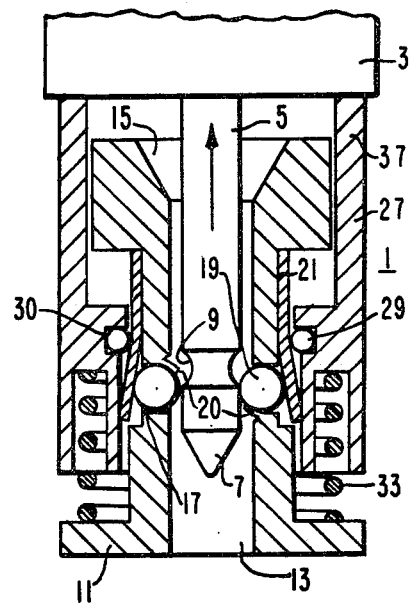

In FIG. 1, the shaft 5 enters the bore 13 and fits freely therein. The nose portion 7 contacts the detents 19 spreading them. As shown in FIG. 2, the protrusions 29 are a large distance from the detents 19 resulting in flexible digital members 25 so that low axial forces on the shaft move the detents 19 outwardly as they are contacted by the nose portion 7. As the shaft 5 continues to move into the bore 13, the missle 3 contacts the upper end of the skirt 27 causing the protrusions 29 to move closer to the detents 19 resulting in stiffer digital members so that when the detents 19 engage the groove 9 the axial force required to remove the shaft 5 from the receptacle is increased substantially to some predetermined value depending on the groove shape, the thickness of the sleeve, and the distance between the detent and the protrusion. As shown in FIG. 4, during release, the skirt 29 is pushed upwardly by the spring 33 readying the apparatus for reuse.

The hereinbefore described holddown apparatus 1 advantageously is passive requiring no pyrotechnic or electric device to initiate release and the entrance and release forces can be set at any predetermined value.

I claim:

1. A holddown apparatus comprising a shaft having a nose portion on one end thereof and a notch adjacent said one end, and a mass attached to a second end of the shaft;
    a receptacle having a bore for receiving said shaft and at least one port in communication with said bore;
    a detent member slidably disposed in said port;
    a sleeve slidably disposed over a portion of said receptacle, said sleeve having a plurality of notches extending from one end thereof forming at least one digital member which contacts said detent member;

a skirt disposed over said sleeve and having at least one protrusion extending from the inner side thereof, the protrusion contacting the digital member and said skirt also having a portion extending beyond said receptacle;

the length of the shaft and position of the port being such that the nose portion of the shaft contacts the detent before the extended portion of the skirt contacts the mass and the extended portion of the skirt contacts the mass before the detent member contacts the notch in the shaft, whereby when the mass moves against the extended portion of the skirt, the protrusion extending from the inner side of the skirt slides toward the distal end of the digital member of the sleeve to increase the force which subsequently is applied through the shaft to initiate removal of the notch in the shaft from the detent member when the shaft is subsequently extracted from the receptacle.

2. A holddown apparatus as set forth in claim 1, wherein the skirt is biased towards the mass.

3. A holddown apparatus as set forth in claim 1, wherein the receptacle is counterbored on one end to form a funnel-shaped opening.

4. A holddown apparatus as set forth in claim 1, wherein the nose portion of the shaft has a blunted point.

5. A holddown apparatus as set forth in claim 1, wherein the detent member is spherical.

6. A holddown apparatus as set forth in claim 1, wherein the protrusion comprises a spherical-shaped member retained in the skirt.

7. A holddown apparatus as set forth in claim 1, wherein the nose portion is generally conically-shaped with a rounded apex.

8. A holddown apparatus as set forth in claim 1, wherein the notch in the shaft is a circumferential groove having a generally semicircular cross section.

9. A holddown apparatus as set forth in claim 8, wherein the receptacle has a plurality of ports and a detent member is slidably disposed in each port, the sleeve has a plurality of digital members which contact the detent members and the skirt has a plurality of protrusions extending from the inner side thereof which contact the digital members.

* * * * *